United States Patent
Matsuno et al.

[11] Patent Number: 6,062,660
[45] Date of Patent: May 16, 2000

[54] ANTILOCK BRAKE CONTROL SYSTEM IN VEHICLE

[75] Inventors: Isao Matsuno, Nagano; Teruyasu Ishikawa, Osaka, both of Japan

[73] Assignees: Nissin Kogyo Co., Ltd., Nagano; NEC Corporation, Tokyo, both of Japan

[21] Appl. No.: 08/872,373

[22] Filed: Jun. 10, 1997

[30] Foreign Application Priority Data

Jun. 10, 1996 [JP] Japan ................................. 8-147673

[51] Int. Cl.[7] ........................................................ B60T 8/72
[52] U.S. Cl. ...................... 303/173; 303/119.1; 303/186; 188/181 C
[58] Field of Search ............................. 303/113.1, 116.1, 303/119.1, 137, 177, 186, 163, 171, 173 OR, 174, 199, 149, 146, 147, 148; 188/181 A, 181 C; 701/71, 73, 74, 78, 79, 83

[56] References Cited

U.S. PATENT DOCUMENTS

| | | | |
|---|---|---|---|
| 5,125,723 | 6/1992 | Sakuma et al. | 303/194 |
| 5,185,704 | 2/1993 | Okubo | 303/186 |
| 5,200,897 | 4/1993 | Makino et al. | 701/74 |
| 5,240,313 | 8/1993 | Yoshino et al. | 701/74 |
| 5,249,848 | 10/1993 | Matsuto et al. | 303/137 |
| 5,282,675 | 2/1994 | Okubo et al. | 303/119.1 |
| 5,297,859 | 3/1994 | Suzuki et al. | 303/137 |
| 5,324,102 | 6/1994 | Roll et al. | 303/137 |
| 5,386,366 | 1/1995 | Roll et al. | 303/9.64 |
| 5,416,708 | 5/1995 | Matsuto et al. | 303/137 |
| 5,577,816 | 11/1996 | Suzuki et al. | 303/163 |
| 5,618,088 | 4/1997 | Roll et al. | 303/158 |
| 5,803,557 | 9/1998 | Horiuchi et al. | 303/173 |
| 5,934,771 | 8/1999 | Ishikawa et al. | 303/163 |

Primary Examiner—Christopher P. Schwartz
Assistant Examiner—Thomas J. Williams
Attorney, Agent, or Firm—Arent Fox Kintner Plotkin & Kahn, PLLC

[57] ABSTRACT

An antilock brake control system in a vehicle is designed to retard the pressure increasing timing in one of front and rear wheel braking liquid pressure regulating devices which corresponds to a wheel having a smaller load share, until the wheel speed of such wheel is started to be reduced while following an actual vehicle speed after being restored to near the actual vehicle speed, when both of front and rear wheels are in antilock brake-controlled state. In this antilock brake control system, when the vehicle deceleration calculated based on a presumed vehicle speed is equal to or lower than a preset deceleration during retarding of the pressure increasing timing in a condition in which both of front and rear wheel brakes are in antilock brake controlled state, the braking liquid pressure control mode is switched over to a maintaining mode, but when the vehicle deceleration is higher than the preset deceleration, the control mode is switched over to a reducing mode, thereby controlling one of the front and rear wheel braking liquid pressure regulating devices which corresponds to the wheel having the smaller load share. Thus, when both of the front and rear wheels are in the antilock brake controlled states, a very accurate presumed vehicle speed can be calculated and moreover, the decrease in total braking force can be inhibited to the utmost.

5 Claims, 10 Drawing Sheets

ANTILOCK BRAKE CONTROL SYSTEM IN VEHICLE

BACKGROUND OF THE INVENTION

1. Field of the Invention

The present invention relates to an antilock brake control system in a vehicle, including a front wheel braking liquid pressure regulating means capable of regulating the braking liquid pressure for a front wheel brake, a rear wheel braking liquid pressure regulating means capable of regulating the braking liquid pressure for a rear wheel brake, a front wheel speed detecting means for detecting a front wheel speed, a rear wheel speed detecting means for detecting a rear wheel speed, a front wheel-use vehicle speed calculating means for calculating a presumed vehicle speed based on the front wheel speed detected by the front wheel speed detecting means, a rear wheel-use vehicle speed calculating means for calculating a presumed vehicle speed based on the rear wheel speed detected by the rear wheel speed detecting means, a reference vehicle speed determining means for determining reference vehicle speeds based on the presumed vehicle speeds calculated respectively in both the vehicle speed calculating means, and a control quantity calculating means adapted to determine operation control quantities for the braking liquid pressure regulating means based on results of determination of wheel slip rates based on the reference vehicle speeds determined in the reference vehicle speed determining means and the wheel speeds detected respectively by the wheel speed detecting means, and to retard the pressure increasing timing in one of the front and rear wheel braking liquid pressure regulating means which corresponds to a wheel having a smaller load share, until the wheel speed of the wheel having the smaller load share is started to be reduced while approximating an actual vehicle speed after that wheel has restored to a level near the actual vehicle speed, when both of the front and rear wheel brakes are in an antilock brake-controlled state.

2. Description of the Related Art

An antilock brake control system is conventionally known, for example, from Japanese Patent Application Laid-open No.6-144193.

In the above-identified antilock brake control system, when both the front and rear wheel brakes are in the antilock brake-controlled state, the timing of increasing the braking pressure for the wheel having the smaller load share is intentionally retarded to cause such wheel to be coasted, in order that the wheel speed of the coasted wheel may follow or approximate the actual vehicle speed, for determining a presumed vehicle speed based on the wheel speed of the coasted wheel accurately to the utmost. In the above known system, however, the braking liquid pressure is reduced in retarding the pressure increasing timing and for this reason, there is a possibility that the braking force may be insufficient for the wheel having the smaller load share in traveling on a road having a relatively high friction coefficient. Especially in a motorcycle, the wheels are a front wheel and a rear wheel and hence, braking force shared by one of the wheels is large, as compared with a vehicle having a larger number of wheels such as a four-wheel vehicle. For this reason, if the braking force for one of the wheels becomes insufficient, the degree of the total braking force decreasing in the vehicle becomes larger.

SUMMARY OF THE INVENTION

Accordingly, it is an object of the present invention to provide an antilock brake control system in a vehicle, wherein when both of the front and rear wheel brakes are in antilock brake-controlled state, a presumed vehicle speed can be calculated with a high accuracy, and moreover, the decrease in total braking force can be inhibited to the utmost.

To achieve the above object, according to the present invention, there is provided an antilock brake control system in a vehicle, comprising a front wheel braking liquid pressure regulating means capable of regulating the braking liquid pressure for a front wheel brake, a rear wheel braking liquid pressure regulating means capable of regulating the braking liquid pressure for a rear wheel brake, a front wheel speed detecting means for detecting a front wheel speed, a rear wheel speed detecting means for detecting a rear wheel speed, a front wheel-use vehicle speed calculating means for calculating a presumed vehicle speed based on the front wheel speed detected by the front wheel speed detecting means, a rear wheel-use vehicle speed calculating means for calculating a presumed vehicle speed based on the rear wheel speed detected by the rear wheel speed detecting means, a reference vehicle speed determining means for determining reference vehicle speeds based on the presumed vehicle speeds calculated respectively in both the vehicle speed calculating means, and a control quantity calculating means adapted to determine operation control quantities for the braking liquid pressure regulating means based on results of determination of slip rates of the wheels based on the reference vehicle speeds determined in the reference vehicle speed determining means and the wheel speeds detected respectively by the wheel speed detecting means, and to retard the pressure increasing timing in one of the front and rear wheel braking liquid pressure regulating means which corresponds to a wheel having a smaller load share, until the wheel speed of the wheel having the smaller load share is started to be reduced while approximating an actual vehicle speed after that wheel speed has restored to a level near the actual vehicle speed, when both of the front and rear wheel brakes are in antilock brake-controlled states, wherein the control quantity calculating means is arranged to calculate a vehicle deceleration based on at least one of the presumed vehicle speeds calculated in the front and rear-use vehicle speed calculating means, which corresponds to the wheel having the smaller load share, and to control the operation of one of the front and rear wheel braking liquid pressure regulating means, which corresponds to the wheel having the smaller load share, in a braking liquid pressure maintaining mode when the vehicle deceleration is equal to or lower than a preset deceleration and in a braking liquid pressure reducing mode when the vehicle deceleration is higher than the preset deceleration.

With such an arrangement, when both of the front and rear wheel brakes are in antilock brake controlled states, a very accurate presumed vehicle speed can be calculated. Moreover, when the vehicle deceleration is relatively large, i.e., the friction coefficient of a travel road surface is relatively high, the braking liquid pressure control mode is switched over to the maintaining mode to retard the pressure increasing timing, thereby inhibiting a decrease in braking force to the utmost that may be caused due to such retard of the pressure increase.

The above and other objects, features and advantages of the invention will become apparent from the following description of the preferred embodiment taken in conjunction with the accompanying drawings.

DETAILED DESCRIPTION OF THE PREFERRED EMBODIMENT

The present invention will now be described by way of an embodiment applied to a motorcycle with reference to FIGS. 1 to 10.

Figure 1:
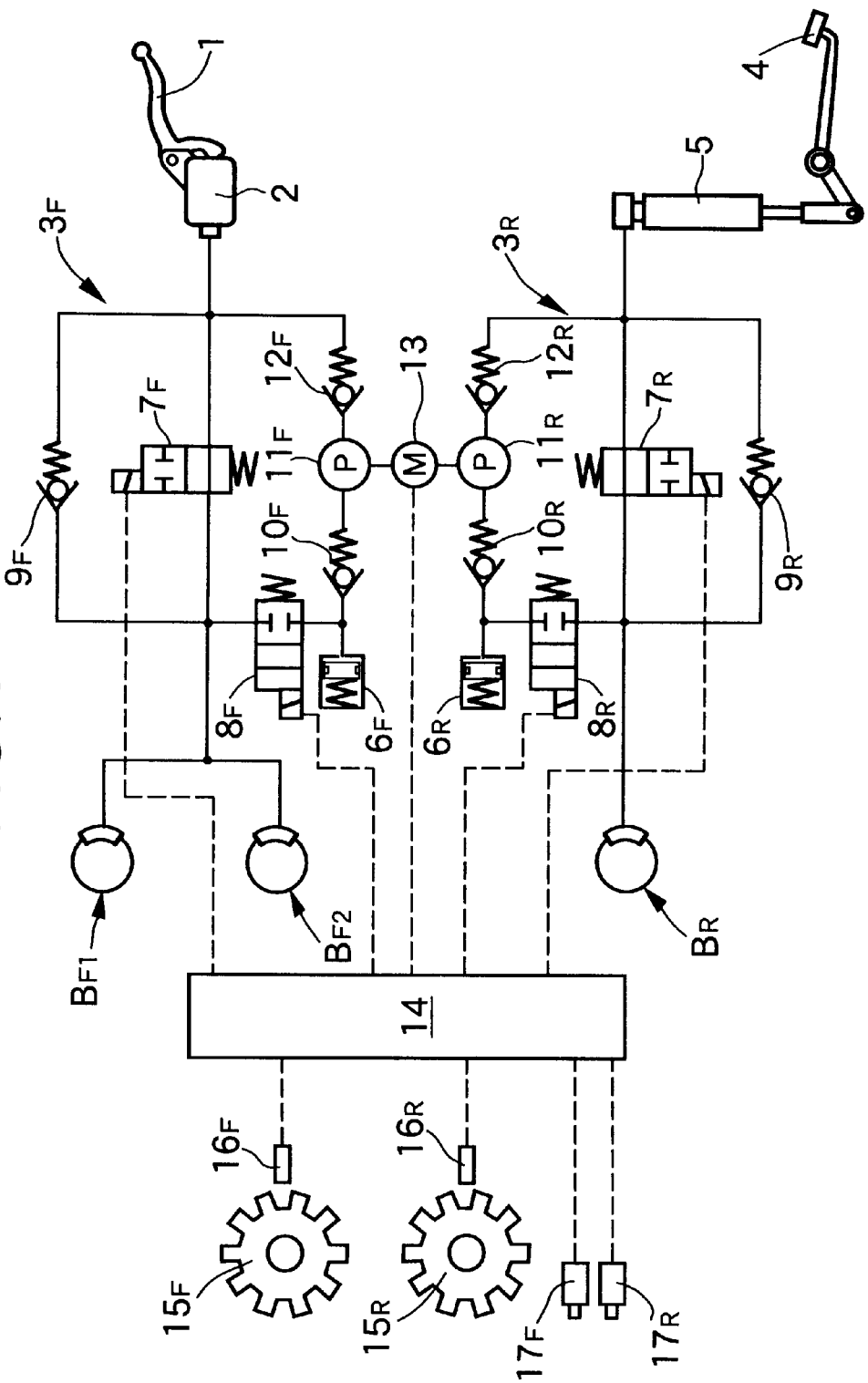
FIG. 1 is an illustration of the entire arrangement of a brake system in a motorcycle.

Referring first to FIG. 1, a front wheel braking liquid pressure regulating means $3_F$ is provided between a master cylinder 2 for outputting a liquid pressure corresponding to operation of a brake lever 1 and a pair of left and right front wheel brakes $B_{F1}$ and $B_{F2}$ mounted on a front wheel of a motorcycle and is capable of regulating braking liquid pressures for the front wheel brakes $B_{F1}$ and $B_{F2}$. A rear wheel braking liquid pressure regulating means $3_R$ is provided between a master cylinder 5 for outputting a liquid pressure depending upon the operation of a brake pedal 4 and a rear wheel brake $B_R$ mounted on a rear wheel of the motorcycle, and is capable of regulating a braking liquid pressure for the rear wheel brake $B_R$.

The front wheel braking liquid pressure regulating means $3_F$ includes a reservoir $6_F$, a normally-open solenoid valve $7_F$ mounted between both the front wheel brakes $B_{F1}$ and $B_{F2}$ and the master cylinder 2, a normally-closed solenoid valve $8_F$ mounted between the reservoir $6_F$ and both the front wheel brakes $B_{F1}$ and $B_{F2}$, a check valve $9_F$ connected parallel to the normally-open solenoid valve $7_F$ to permit a braking fluid to flow from both the front wheel brakes $B_{F1}$ and $B_{F2}$ toward the master cylinder 2, and a return pump $11_F$ having an inlet connected to the reservoir $6_F$ through an intake valve $10_F$ and an outlet connected to the master cylinder 2 through a discharge valve $12_F$.

The rear wheel braking liquid pressure regulating means $3_R$ is constructed in the same manner as is the front wheel braking liquid pressure regulating means $3_F$, and includes a reservoir $6_R$, a normally-open solenoid valve $7_R$, a normally-closed solenoid valve $8_R$, a check valve $9_R$, an intake valve $10_R$, a return pump $11_R$, and a discharge valve $12_R$.

Moreover, the return pump $11_F$ of the front wheel braking liquid pressure regulating means $3_F$ and the return pump $11_R$ of the rear wheel braking liquid pressure regulating means $3_R$ are driven by a common motor 13.

Controlled by a control unit 14 are the normally-open and closed solenoid valves $7_F$ and $8_F$ of the front wheel braking liquid pressure regulating means $3_F$, the normally-open and closed solenoid valves $7_R$ and $8_R$ of the rear wheel braking liquid pressure regulating means $3_R$ and the motor 13 common to both the braking liquid pressure regulating means $3_F$ and $3_R$. Input to the control unit 14 are output signals from a front wheel speed sensor $16_F$ fixedly disposed on an opposed relation to a side of a pulser gear $15_F$ fixed to the front wheel, a rear wheel speed sensor $16_R$ fixedly disposed on an opposed relation to a side of a pulser gear $15_R$ fixed to the rear wheel, a front wheel brake switch $17_F$ and a rear wheel brake switch $17_R$. The control unit 14 controls the operations of the normally-open solenoid valves $7_F$ and $7_R$, the normally-closed solenoid valves $8_F$ and $8_R$ and the motor 13 in accordance with the outputs from the sensors $16_F$ and $16_R$ and the switches $17_F$ and $17_R$.

Figure 2:
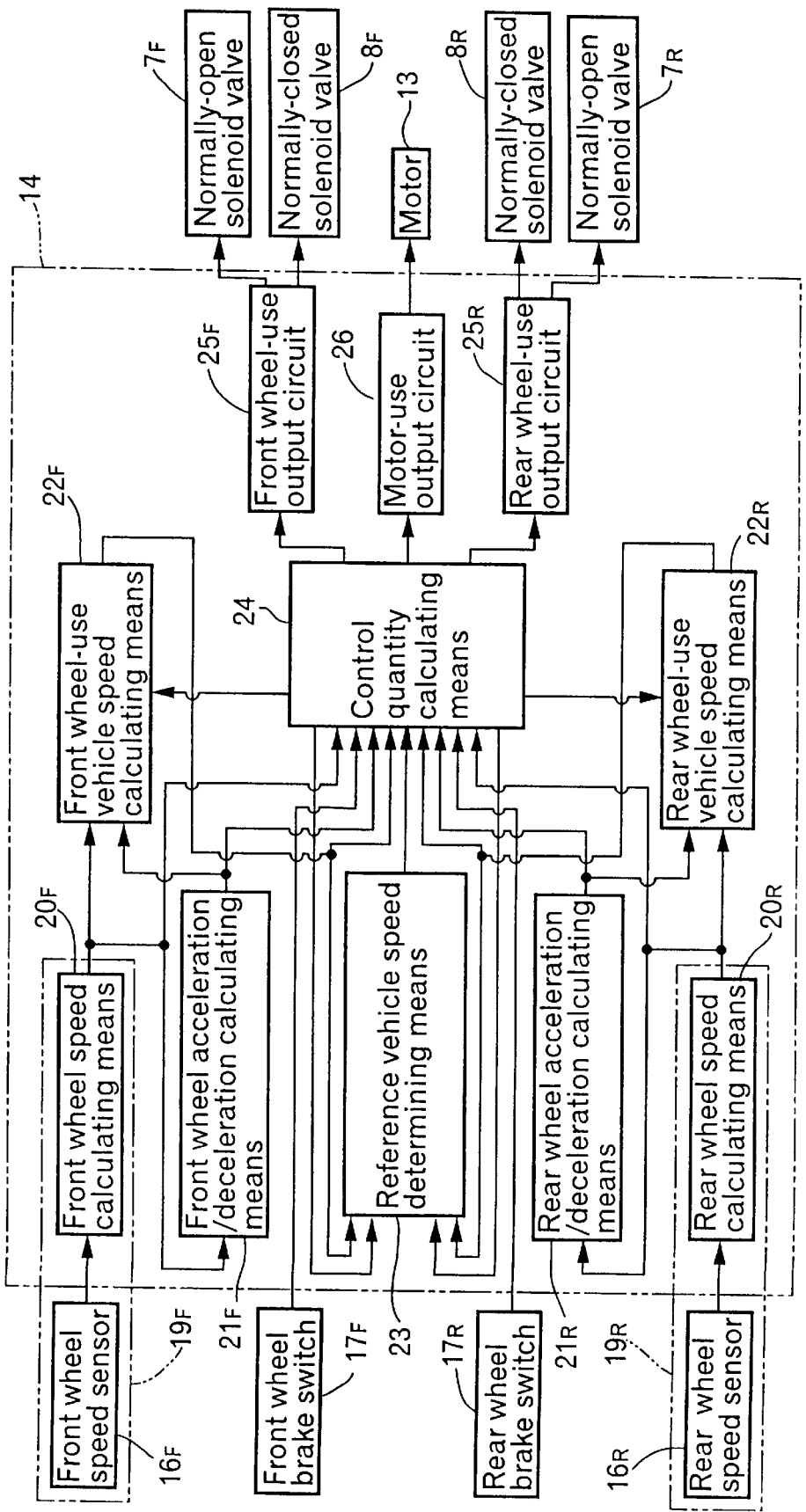
FIG. 2 is a block diagram illustrating the arrangement of a control unit.

Referring to FIG. 2, the control unit 14 includes a front wheel speed calculating means $20_F$, a rear wheel speed calculating means $20_R$, a front wheel acceleration/deceleration calculating means $21_F$, a rear wheel acceleration/deceleration calculating means $21_R$, a front wheel-use vehicle speed calculating means $22_F$, a rear wheel-use vehicle speed calculating means $22_R$, a reference vehicle speed determining means 23, a control quantity calculating means 24, a front wheel-use output circuit $25_F$, a rear wheel-use output circuit $25_R$, and a motor output circuit 26.

The front wheel speed calculating means $20_F$ calculates a front wheel speed under a reception of the output signal from the front wheel speed sensor $16_F$, and constitutes a front wheel speed detecting means $19_F$ together with the front wheel speed sensor $16_F$. The rear wheel speed calculating means $20_R$ calculates a rear wheel speed under a reception of the output signal from the rear wheel speed sensor $16_R$, and constitutes a rear wheel speed detecting means $19_R$ together with the rear wheel speed sensor $16_R$.

The front wheel acceleration/deceleration calculating means $21_F$ differentiates the front wheel speed calculated in the front wheel speed calculating means $20_F$ in the front wheel speed detecting means $19_F$ to obtain a front wheel acceleration/deceleration. The rear wheel acceleration/deceleration calculating means $21_R$ differentiates the rear wheel speed calculated in the rear wheel speed calculating means $20_R$ in the rear wheel speed detecting means $19_R$ to obtain a rear wheel acceleration/deceleration.

The front wheel-use vehicle speed calculating means $22_F$ calculates a presumed front wheel-use vehicle speed based on the front wheel speed detected by the front wheel speed detecting means $19_F$, the front wheel acceleration/deceleration calculated in the front wheel acceleration/deceleration calculating means $21_F$ and a signal from the control quantity calculating means 24 which indicates that the front wheel brakes are in antilock brake-controlled states. The presumed vehicle speed is calculated according to a processing procedure shown in FIG. 3.

Figure 3:
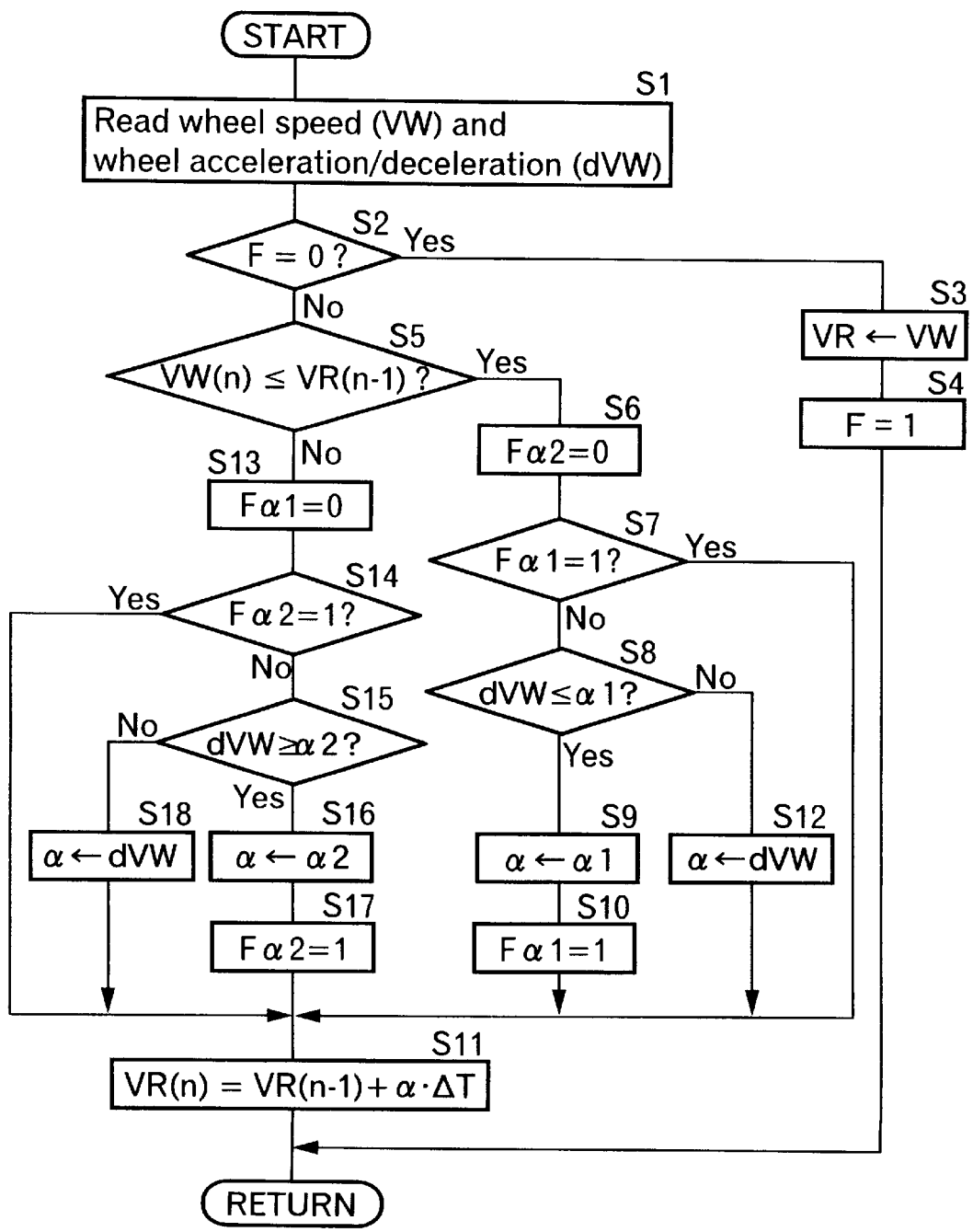
FIG. 3 is a flow chart illustrating a vehicle speed presuming procedure.

At step S1 in FIG. 3, a front wheel speed VW detected by the front wheel speed detecting means $19_F$ and a front wheel acceleration/deceleration dvw calculated by the front wheel acceleration and deceleration calculating means $21_F$ are read. At step S2, it is determined whether a flag F is equal to "0". If F=0, the front wheel speed VW is determined as a presumed vehicle speed VR at step S3, and then, the flag F is set at "1" at step S4. The steps S1 to S4 are processing steps at the start of the calculation of the presumed vehicle speed. Thus, in a next calculating cycle, F=1 and hence, the processing is advanced from step S2 to step S5.

At step S5, it is determined whether a current wheel speed VW(n) is equal to or smaller than a last presumed vehicle speed VR(n−1), i.e., whether the front wheel speed is in a constant or reducing course. If it is determined that the front wheel speed is in the constant or reducing course, the processing is advanced to step S6 and following steps, at which it is determined whether dVW≦α1, i.e., whether the deceleration of the front wheel speed is equal to or lower than a preset deceleration α1 (for example, −1G). If VW(n)<VR(n−1), i.e., when it can be determined that the front wheel speed is in the constant or reducing course, the processing is advanced to step S6, at which a flag Fα2 is set at "0". At step S7, it is determined whether Fα1=1. The flag Fα1 assumes "1" when the acceleration/deceleration is set at the preset deceleration α1 in the reducing course. In a first processing cycle, Fα1=0 and hence, the processing is advanced from step S7 to step S8.

At step S8, it is determined whether dVW≦α1, i.e., whether the deceleration of the front wheel speed is equal to or lower than the preset deceleration α1. If dVW≦α1, the acceleration/deceleration a is set at the preset deceleration α1 at step S9, and the flag Fα1 is set at "1" at step S10, progressing to step S11.

At step S11, the calculation of the presumed vehicle speed VR is carried out. If the last presumed vehicle speed is represented by VR(n−1) and the calculating cycle time is represented by ΔT (for example, 3 msec), the current presumed vehicle speed VR(n) is calculated according to the following equation:

$$VR(n)=VR(n-1)+\alpha \cdot \Delta T$$

If it is determined at step S8 that dVW>α1, the acceleration/deceleration α is determined at the front wheel acceleration/deceleration dVW at step S12, progressing to step S11. If it is determined at step S7 that Fα=1, the processing is advanced from step S7 to step S11. That is, when the front wheel acceleration/deceleration dVW is equal to or higher than the preset deceleration α 1, the calculation of the presumed vehicle speed VR is carried out based on the assumption that the vehicle speed is being reduced at the preset deceleration α1 in the subsequent reducing course.

If it is determined at step S5 that VW(n)>VR(n−1), i.e., the front wheel speed is in an increasing course, the processing is advanced from step S5 to step S13, at which the flag Fα1 is set at "0". Then, it is determined at step S14 whether a flag Fα2 is equal to 1. The flag Fα2 assumes "1" when the acceleration/deceleration is a preset acceleration α2 in the increasing course. Thus, in the first processing cycle of the increasing course, Fα2 is equal to 0 and hence, the processing is advanced from step S14 to step S15, at which it is determined whether dVW≧α2, i.e., the acceleration of the front wheel speed is equal to or larger than the preset acceleration α2. If dVW≧α2, the acceleration/deceleration α a is set at the preset acceleration α2 at step S16, and the flag Fα2 is set at "1" at step S17, progressing to step S11. If dVW<α2, the acceleration/deceleration α is set at the front wheel acceleration/deceleration dVW at step S18, progressing to step S11. If it is determined that Fα2=1 at step S14, the processing is advanced directly to step S11. In other words, if the front wheel acceleration/deceleration dVW is equal to or larger than the preset acceleration α2 in the front wheel speed increasing course, the calculation of the presumed vehicle speed VR is carried out on the assumption that the vehicle speed is being increased at the preset acceleration α2 in the subsequent increasing course.

Figure 4:
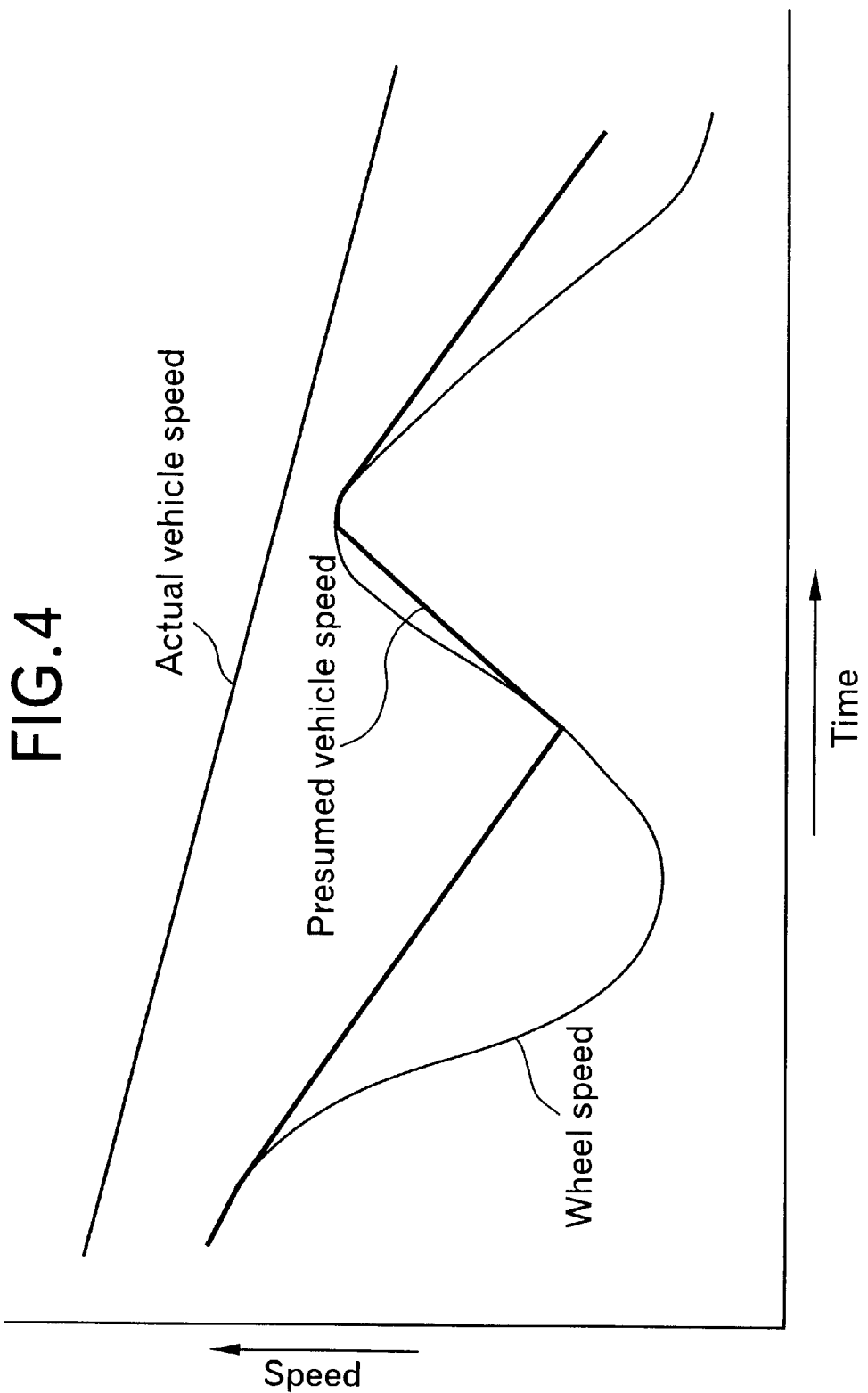
FIG. 4 is a diagram for explaining a process for calculating a presumed vehicle speed based on a wheel speed.

According to such calculation in the front wheel-use vehicle speed calculating means $22_F$, the presumed vehicle speed is as shown in FIG. 4. In the front wheel speed reducing course, the presumed vehicle speed VR is calculated using the deceleration of the front wheel speed, so that it does not become a deceleration equal to or larger than the preset deceleration α1. In the front wheel speed Increasing course, the presumed vehicle speed VR is calculated using the acceleration of the front wheel speed, so that it does not become an acceleration equal to or larger than the preset acceleration α2.

Thus, the preset acceleration α2 is, for example, +1G, but may be set at a larger value during the antilock brake control and may be varied in accordance with the vehicle deceleration.

The rear wheel-use vehicle speed calculating means $22_R$ calculates a presumed vehicle speed for the rear wheel based on the rear wheel speed detected by the rear wheel speed detecting means $19_R$, the rear wheel acceleration/deceleration calculated in the rear wheel acceleration/deceleration calculating means $21_R$ and the signal from the control quantity calculating means 24 which indicates that the rear wheel brake is in the antilock brake-controlled state. The presumed vehicle speed is calculated according to a processing procedure similar to that shown in FIG. 3.

The reference vehicle speed determining means 23 determines reference vehicle speeds for the front and rear wheels which are criterion for determining a slip rate, based on the front wheel-use presumed vehicle speed calculated in the front wheel-use vehicle speed calculating means $22_F$, the rear wheel-use presumed vehicle speed calculated in the rear wheel-use vehicle speed calculating means $22_R$ and the signal from the control quantity calculating means 24 which indicates that the wheel brakes are in the antilock brake-controlled states. The reference vehicle speeds are determined according to a procedure shown in FIG. 5.

Figure 5:
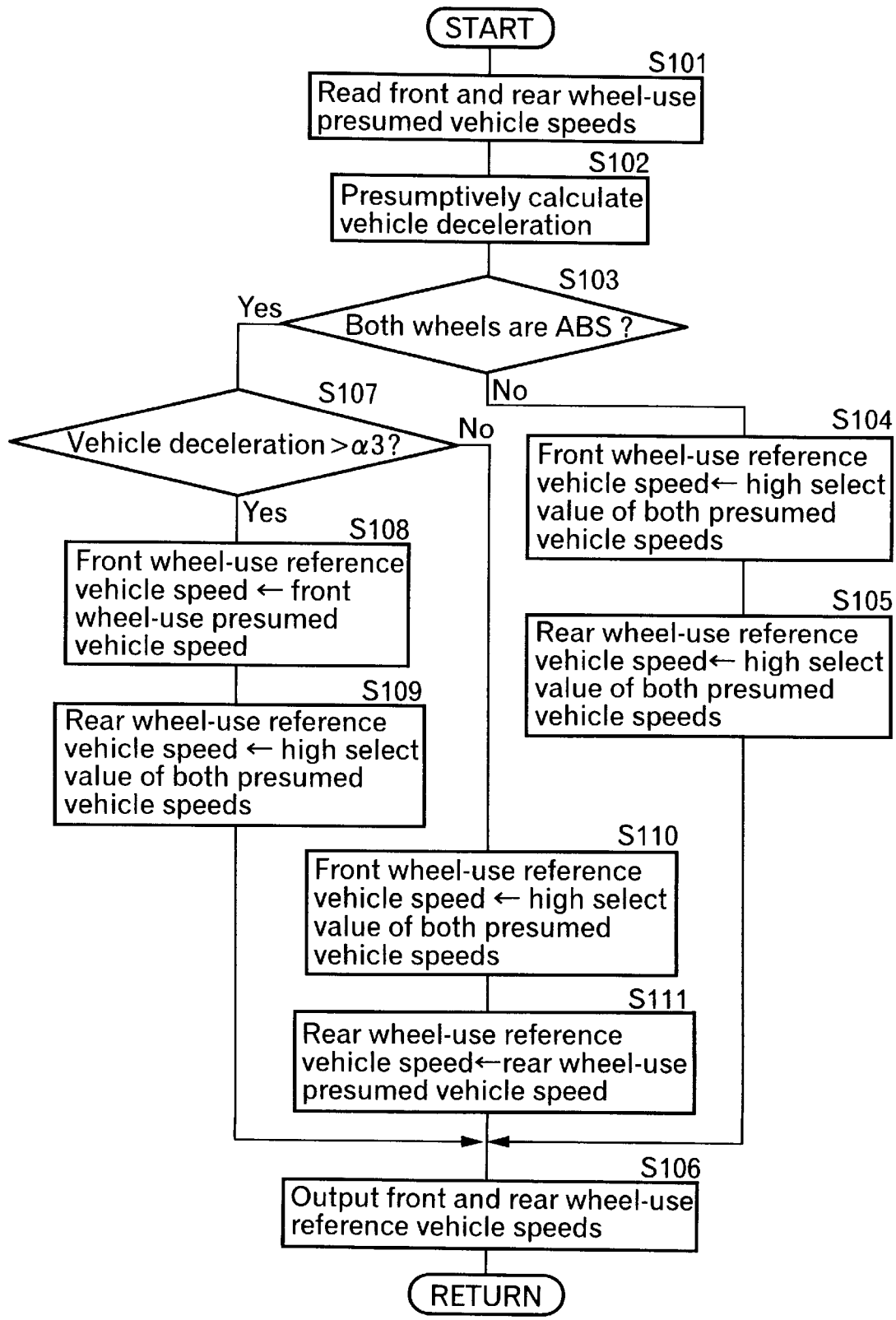
FIG. 5 is a flow chart illustrating a reference vehicle speed determining procedure.

At step S101 in FIG. 5, the front wheel-use presumed vehicle speed calculated in the front wheel-use vehicle speed calculating means $22_F$ and the rear wheel-use presumed vehicle speed calculated in the rear wheel-use vehicle speed calculating means $22_R$ are read. At next step S102, a vehicle deceleration is calculated from an amount of variation in presumed vehicle speed based on, for example, a wheel having a smaller load share.

At step S103, it is judged whether both of the front and rear wheel brakes $B_{F1}$, $B_{F2}$ and $B_R$ are in antilock brake controlled state. If it is determined that the brakes are not in antilock brake controlled state or that only the front wheel brakes $B_{F1}$, and $B_{F2}$ or only the rear wheel brake $B_R$ are/is in antilock brake controlled state, the front and rear reference vehicle speeds are each set at a high-select value of the front and rear wheel-use presumed vehicle speeds at steps S104 and S105, and the reference vehicle speeds are output at step S106.

Figure 6:
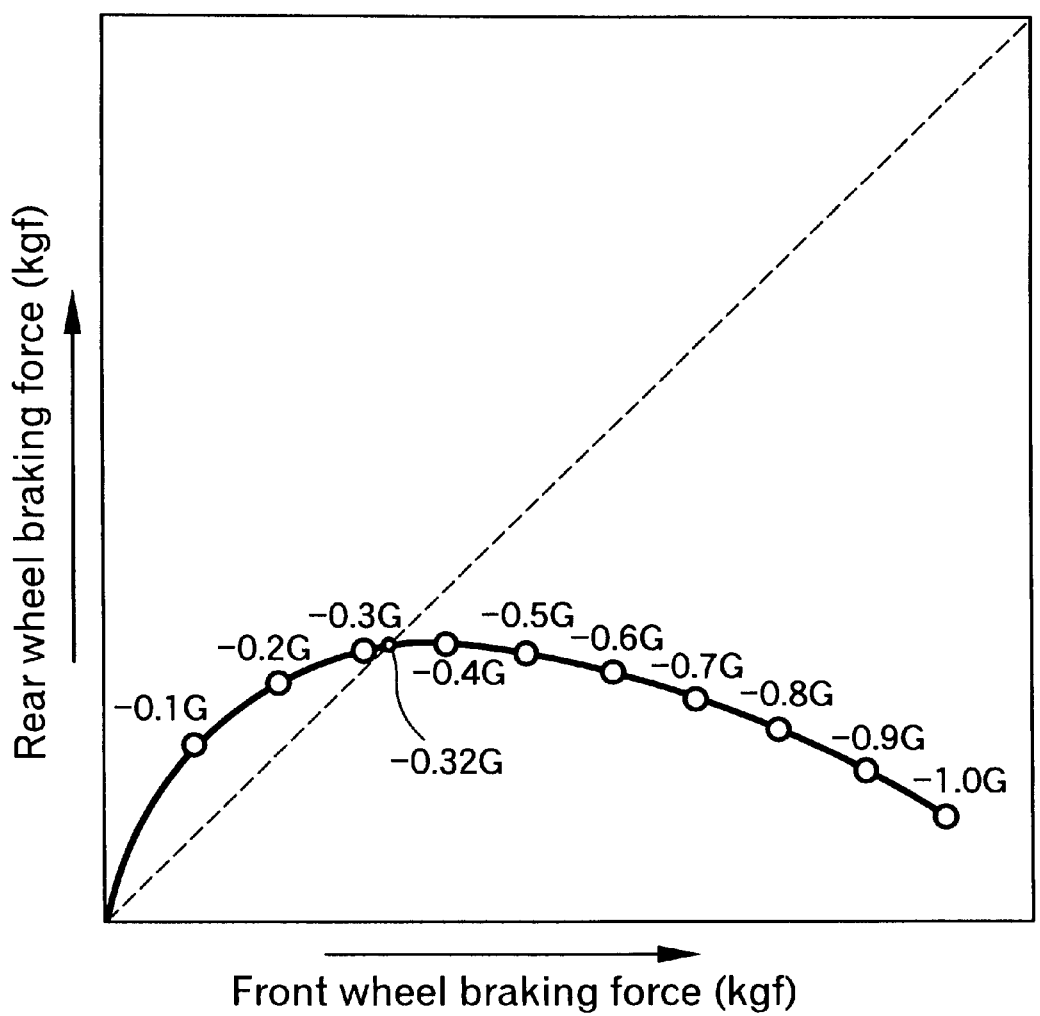
FIG. 6 is a diagram of a theoretic braking force distribution.

If it is determined at step S103 that both of the front and rear wheel brakes $B_{F1}$, $B_{F2}$ and $B_R$ are in antilock brake controlled states, it is determined whether the vehicle speed deceleration presumed at step S102 is higher than a preset deceleration α3, i.e., whether the vehicle speed deceleration is a smaller deceleration. A theoretic braking force distribution in the motorcycle is shown in FIG. 6. If the vehicle speed deceleration>−0.32G in the diagram of the theoretic braking force distribution, it is considered that the rear wheel brake $B_R$ contributes to the entire braking force at a higher rate and has a larger load share. Thus, it can be considered that the load share of the front wheel is lower than that of the rear wheel, when the vehicle speed deceleration>α3, by setting the preset deceleration α3 at −0.32G. If the vehicle speed deceleration>α3, the reference vehicle speed for the front wheel having the smaller load share is set at the front wheel-use presumed vehicle speed at step S108, and the reference vehicle speed for the rear wheel having the larger load share is set at a high-select value at step S109. If the vehicle deceleration≦α3, the reference vehicle speed for the front wheel having the larger load share is set at the high-select value of the front and rear wheel-use presumed vehicle speeds at step S110, and the reference vehicle speed for the rear wheel having the smaller load share is set at the rear wheel-use presumed vehicle speed at step S111.

That is, during a non-antilock brake control, as well as when only the front brakes BF1 and BF2 or only the rear wheel brake $B_R$ is in the antilock brake-controlled state, the reference vehicle speed determining means 23 determines the high-select value of the front and rear wheel-use presumed vehicle speeds as the reference vehicle speed. However, when both of the front and rear wheel brakes $B_{F1}$, $B_{F2}$ and $B_R$ are in the antilock brake-controlled state, the reference vehicle speed determining means 23 determines the reference vehicle speed for the wheel having the larger load share as the high-select value of the front and rear wheel-use presumed vehicle speeds, and the reference vehicle speed for the wheel having the smaller load share as the presumed vehicle speed corresponding to such wheel.

The following output signals are input to the control quantity calculating means 24: output signals from the front and rear wheel brake switches $17_F$ and $17_R$, output signals from the front and rear wheel acceleration/deceleration calculating means $21_F$ and $21_R$, output signals from the front and rear wheel-use vehicle speed calculating means $22_F$ and $22_R$, an output signal from the reference vehicle speed determining means 23 and output signals from the front and rear wheel-use speed detecting means $19_F$ and $19_R$. Thus, the control quantity calculating means 24 determines a slip rate of the front wheel based on the front wheel-use reference vehicle speed determined by the reference vehicle speed determining means 23 and the front wheel speed detected by the front wheel speed detecting means $19_F$, determines a slip rate of the rear wheel based on the rear wheel-use reference vehicle speed determined by the reference vehicle speed determining means 23 and the rear wheel speed detected by the rear wheel speed detecting means $19_R$, and outputs a control signal indicative of a command to control the braking liquid pressure for the front wheel brakes $B_{F1}$ and $B_{F2}$ and a control signal indicative of a command to control the braking liquid pressure for the rear wheel brake $B_R$. The control quantity calculating means 24 outputs a control signal indicative of a command to operate the motor 13 during the antilock brake control. The control signal indicative of the command to control the braking liquid pressure for the front wheel brakes $B_{F1}$ and $B_{F2}$ is applied to the front wheel-use output circuit $25_F$ through the control quantity calculating means 24, and the energization and deenergization of the normally-open solenoid valve $7_F$ and the normally-closed solenoid valve $8_F$ in the front wheel braking liquid pressure regulating means $3_F$ is switched over from one to another by the front wheel-use output circuit $25_F$. The control signal indicative of the command to control the braking liquid pressure for the rear wheel brake $B_R$ is applied to the rear wheel-use output circuit $25_R$ through the control quantity calculating means 24, and the energization and deenergization of the normally-open solenoid valve $7_R$ and the normally-closed solenoid valve $8_R$ in the rear wheel braking liquid pressure regulating means $3_R$ is switched over from one to another by the rear wheel-side output circuit $25_R$. Further, the motor control signal output from the control quantity calculating means 24 is applied to the motor output circuit 26, and the operation and stoppage of the motor 13 are switched over from one to another by the motor output circuit 26.

Moreover, the control quantity calculating means 24 outputs a control signal such that the pressure-increasing timing in one of the braking liquid pressure regulating means $3_F$ and $3_R$ corresponding to the wheel having the smaller load share is retarded until the wheel speed of such wheel is started to be reduced while following the actual vehicle speed after restoring of the wheel speed of such wheel to near the actual vehicle speed, when both of the front wheel brakes $B_{F1}$ and $B_{F2}$ and the rear wheel brake $B_R$ are in the antilock brake-controlled state. Thus, the wheel having the smaller load share is coasted while following the actual vehicle speed.

Figure 7:
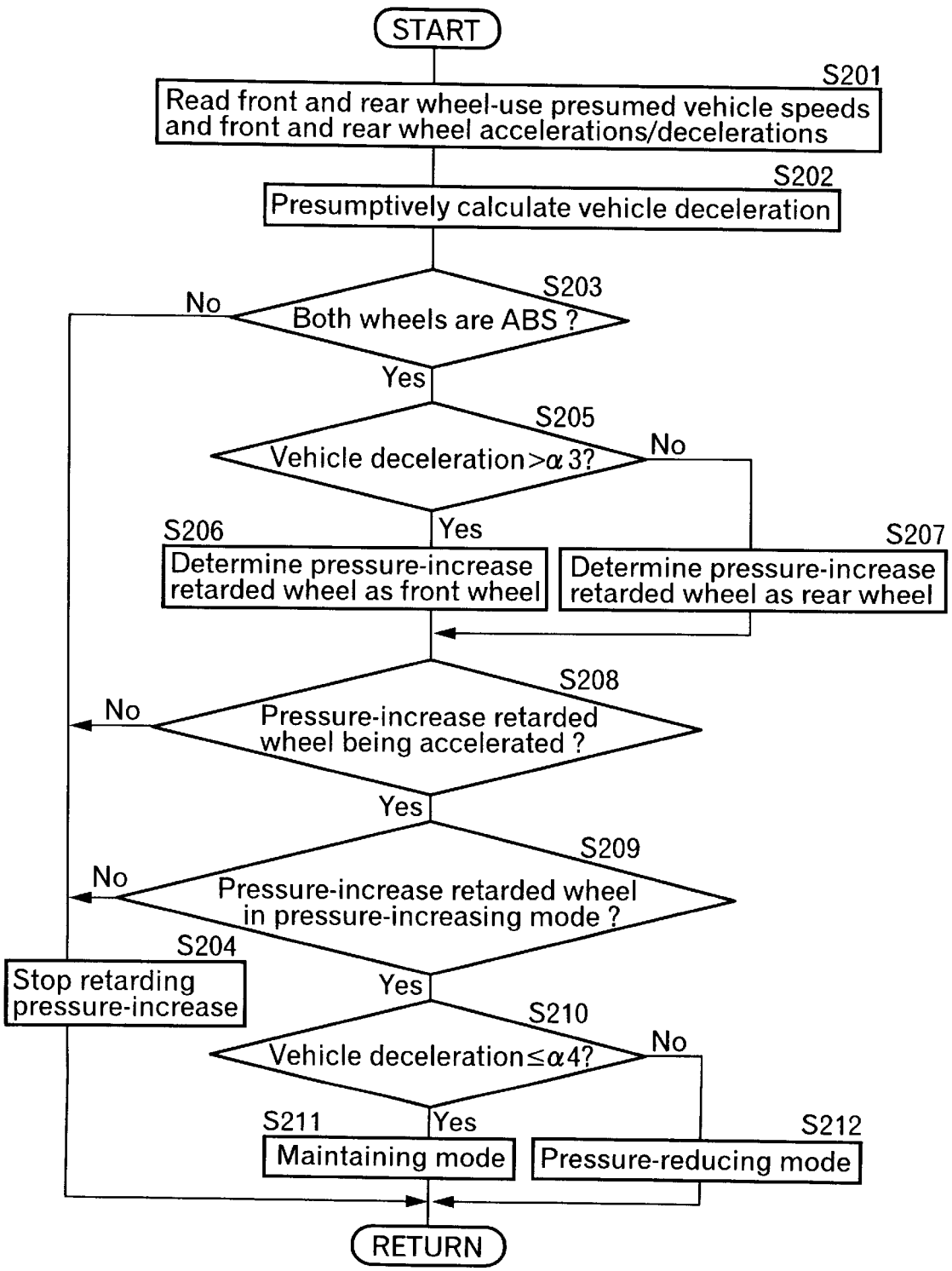
FIG. 7 is a flow chart illustrating a pressure-increase retarding control procedure.

A procedure of a pressure-increase retarding control in the control quantity calculating means 24 will be described with reference to FIG. 7. First, at step S201, the front wheel-use presumed vehicle speed calculated in the front wheel-use vehicle speed calculating means $22_F$, the rear wheel-use presumed vehicle speed calculated in the rear wheel-use vehicle speed calculating means $22_R$, the front wheel acceleration/deceleration calculated in the front wheel acceleration/deceleration calculating means $21_F$ and the rear wheel acceleration/deceleration calculated in the rear wheel acceleration/deceleration calculating means $21_R$ are read. At next step S202, a vehicle deceleration based on one of the presumed vehicle speeds calculated in the front and rear wheel-use vehicle speed calculating means $22_F$ and $22_R$ which corresponds to the wheel having the smaller load share, e.g., a vehicle deceleration based on a high-select value of the front and rear wheel-use presumed vehicle speeds is calculated.

At step S203, it is determined whether both of the front and rear wheel brakes $B_{F1}$, $BF_{F2}$ and $B_R$ have been brought into the antilock brake-controlled state. If it is determined that both of the front and rear wheel brakes $B_{F1}$, $B_{F2}$ and $B_R$ are in non-antilock brake controlled state, or only the front wheel brakes $B_{F1}$, $B_{F2}$ or only the rear wheel brake $B_R$ are/is in the antilock brake-controlled state, the pressure-increase retarding control is stopped at step S204.

If it is determined at step S203 that both of the front and rear wheel brakes $B_{F1}$, $B_{F2}$ and $B_R$ are in the antilock brake controlled state, it is determined at step S205 whether the vehicle deceleration presumed at step S202 is higher than the preset deceleration α3, i.e., is a smaller deceleration. This determination is for determining which of the load shares of the front and rear wheels is smaller, as in the reference vehicle speed determining procedure shown in FIG. 5. If the vehicle deceleration>α3, it can be considered that the load share of the front wheel is smaller than that of the rear wheel. Therefore, the wheel having the smaller load share is determined as being a pressure-increase retarded wheel at step S206. If the vehicle deceleration<α3 at step S205, the rear wheel having the smaller load share is defined as being a pressure-increase retarded wheel.

At step S208 subsequent to steps S206 and S207, it is determined whether the wheel defined as being the pressure-increase retarded wheel is being accelerated. If the wheel is not being accelerated, the processing is advanced to step S204. If the wheel is being accelerated, the processing is advanced to step S209. At step S209, it is determined whether the control mode for the wheel defined as being the pressure-increase retarded wheel is a pressure-increasing mode. If the control mode is a pressure non-increasing mode, the processing is advanced to step S204. If the control mode is the pressure increasing mode, the processing is advanced to step S210.

At step S210, it is determined whether the vehicle deceleration is equal to or lower than a preset deceleration α4, i.e., is a larger deceleration. If the vehicle deceleration is equal to or lower than the preset deceleration α4, the control mode is defined as a maintaining mode at step S211. If the vehicle deceleration is higher than the preset deceleration α4, the control mode is defined as a pressure-reducing mode at step S212. The preset deceleration α4 may be set properly depending upon the vehicle. However, when the control mode is defined as the maintaining mode in a condition in which the deceleration is significantly small (i.e., the friction coefficient of a travel road surface is relatively low), the slip rate becomes higher, resulting in a decreased accuracy of presumption of the presumed vehicle speed. When the control mode is defined as the pressure-reducing mode in a condition in which the deceleration is very large (i.e., the friction coefficient of a travel road surface is relatively high), the braking force is decreased. Therefore, it is desirable that the preset deceleration α4 is set in a range of about −0.3 to −0.5 G.

The operation of this embodiment will be described below. When both of the front and rear wheel brakes $B_{F1}$, $B_{F2}$ and $B_R$ are in the antilock brake-controlled states, the wheel having the smaller load share can be intentionally coasted in such a manner the wheel speed of the coasted wheel follows the actual vehicle speed, thereby extremely accurately providing a presumed vehicle speed based on the wheel speed of the coasted wheel.

Figure 8:
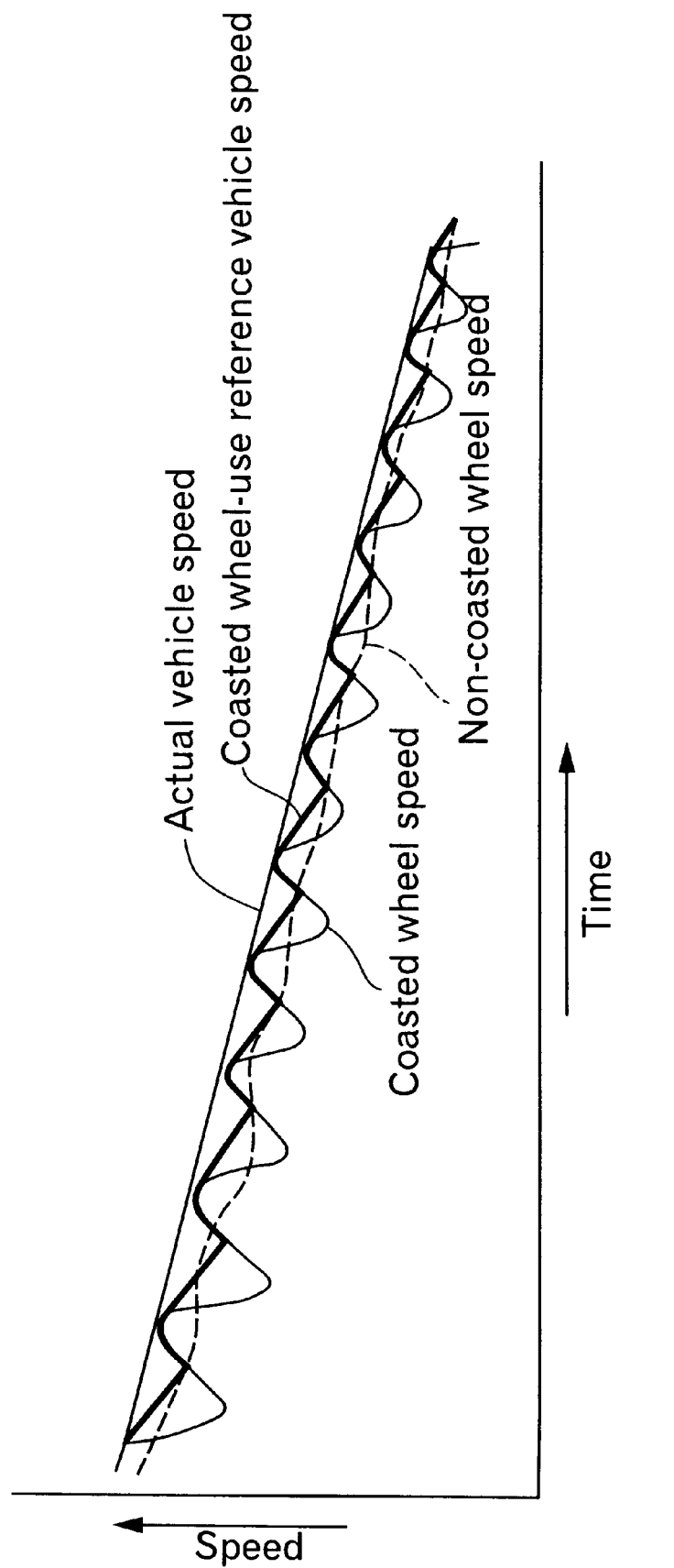
FIG. 8 is a diagram illustrating the interrelation among the actual vehicle speed, the presumed vehicle speed and the wheel speeds.

Moreover, both of the front and rear wheel brakes $B_{F1}$, $B_{F2}$ and $B_R$ are in the antilock brake-controlled states, the reference vehicle speed for the wheel having the larger load share is defined as the high-select value of the front and rear wheel-use vehicle speeds, and the reference vehicle speed for the wheel having the smaller load share is defined as the presumed vehicle speed corresponding to such wheel. Thus, it is possible to control the reference vehicle speed of the coasted wheel to a value near the actual vehicle speed immediately, as shown in FIG. 8, and to shorten the control cycle.

Figure 9:
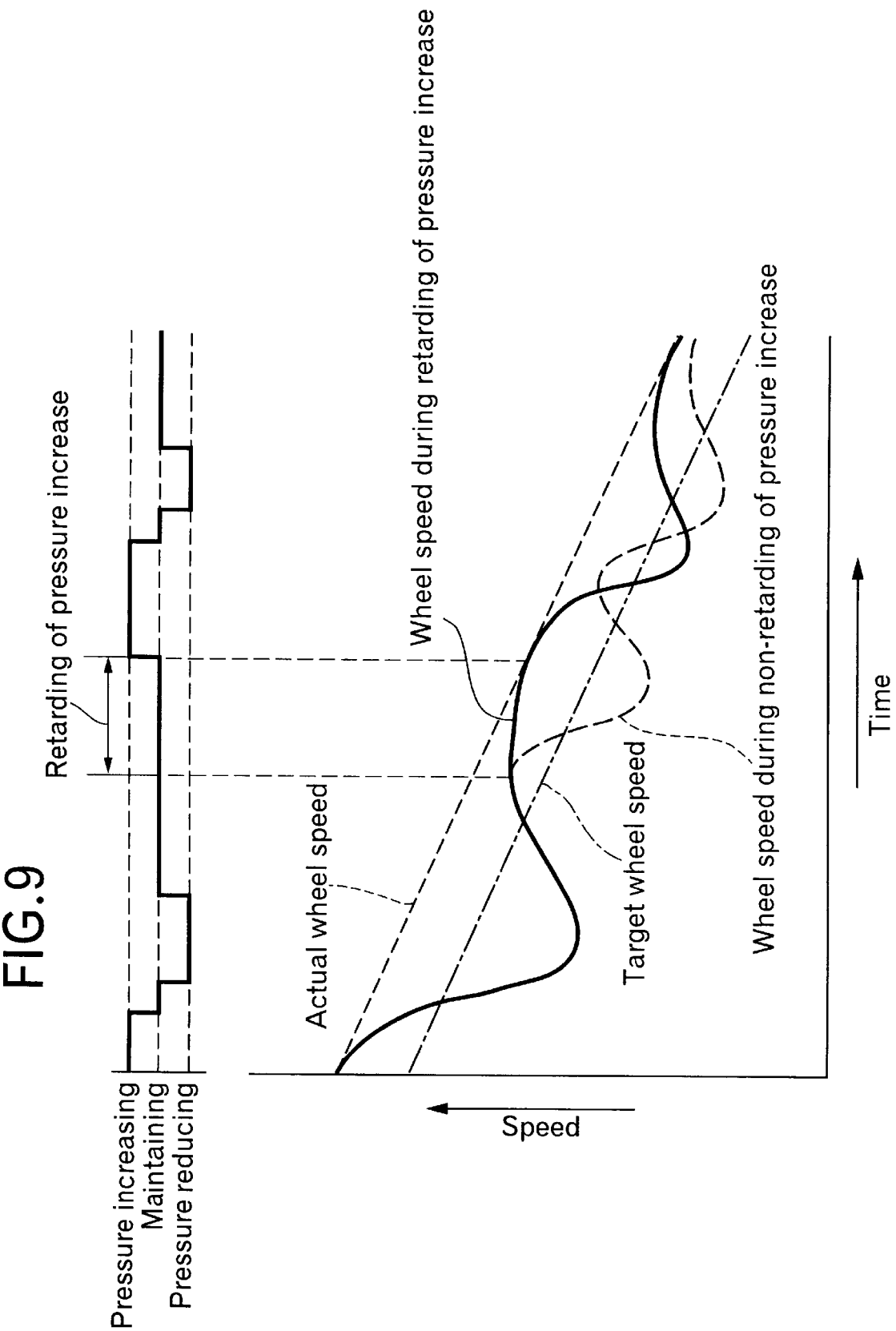
FIG. 9 is a diagram illustrating variations in wheel speeds during retarding of the pressure increase by the maintaining mode.
Figure 10:
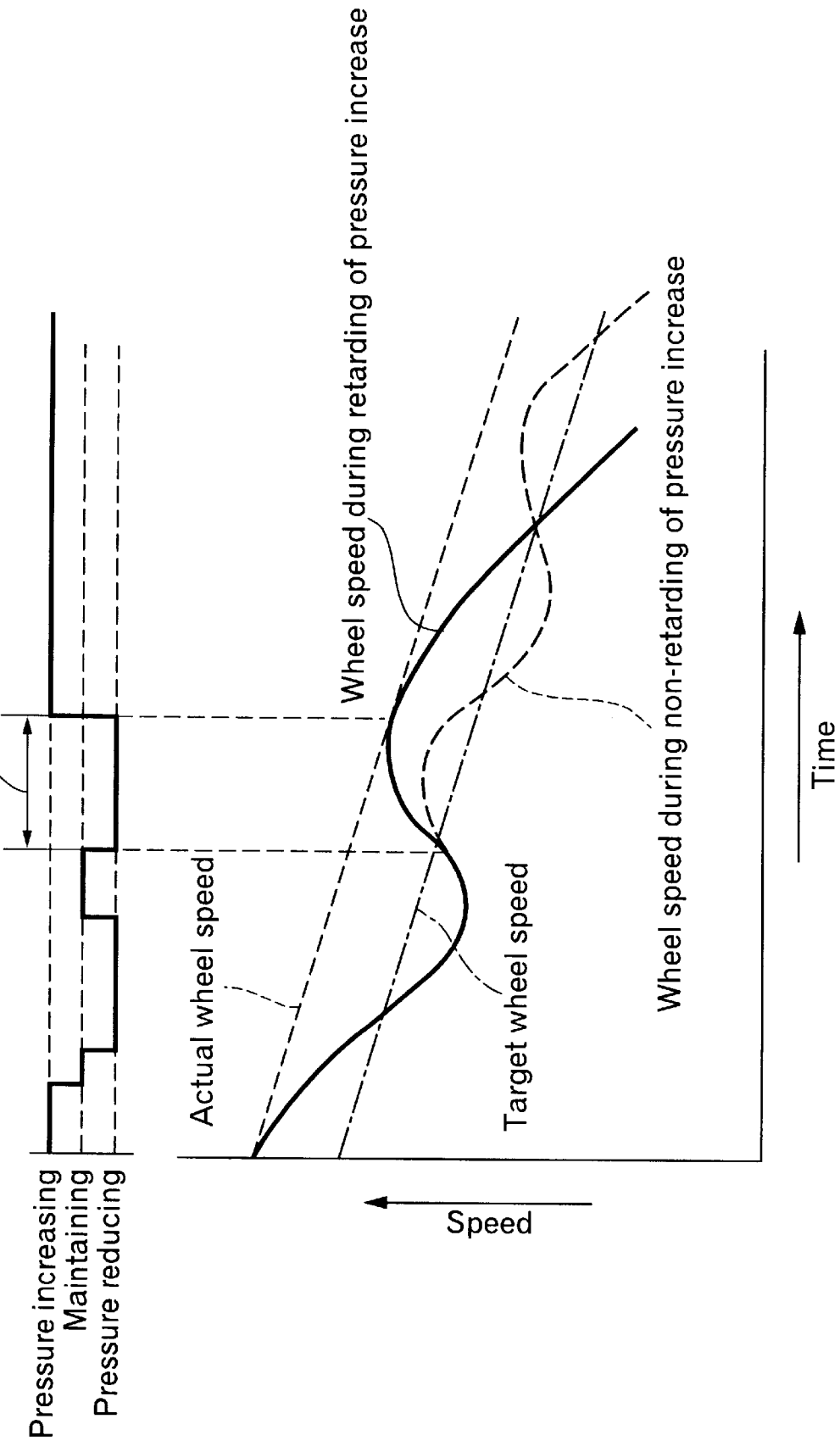
FIG. 10 is a diagram illustrating variations in wheel speeds during retarding of the pressure increase by the reducing mode.

In retarding the pressure increase, the control mode is switched over to the maintaining mode to retard the pressure increasing timing, as shown in FIG. 9, when the vehicle deceleration is a lower deceleration equal to or larger than the preset deceleration α4 (when the friction coefficient of a travel road surface is relatively high). When the vehicle deceleration is a higher deceleration smaller than the preset deceleration α4 (when the friction coefficient of a travel road surface is relatively low), the control mode is switched over to the pressure reducing mode to retard the pressure increasing timing, as shown in FIG. 10. When the friction coefficient of a travel road surface is relatively high, the wheel speed can be restored to near the actual vehicle speed by the relatively large friction force to the travel road surface, even by maintaining the braking pressure without reducing the braking pressure. Even if the braking pressure for the wheel having the smaller load share is maintained rather than being reduced when the friction coefficient of a travel road surface is relatively high, the presumed vehicle speed can be presumed with a good accuracy, and the decrease in braking force can be inhibited, and even in the motorcycle, the decrease in total braking force can be inhibited to the upmost.

Although the embodiment of the present invention has been described in detail, it will be understood that the present invention is not limited to the above-described embodiment, and various modifications in design may be made without departing from spirit and scope of the invention defined in claims.

For example, a presumed friction coefficient of a travel road surface may be used in place of using the presumed vehicle deceleration to determine a wheel having a smaller load share. In this case, the load share of the front wheel is smaller on a road surface having a low friction coefficient, and the load share of the rear wheel is smaller on a road surface having a high friction coefficient. Conventionally provided means may be used for determining the friction coefficient of a travel road surface. When a wheel having a smaller load share is always definite, the construction may be such that a vehicle deceleration is determined from a presumed vehicle speed based on a wheel speed of the wheel having the smaller load share. Further, the present invention is not limited to the motorcycle and may be applicable to a four-wheel automobile vehicle and the like.

What is claimed is:

1. An antilock brake control system in a vehicle, comprising:

a front wheel braking liquid pressure regulating means capable of regulating the braking liquid pressure for a front wheel brake, a rear wheel braking liquid pressure regulating means capable of regulating the braking liquid pressure for a rear wheel brake, a front wheel speed detecting means for detecting a front wheel speed, a rear wheel speed detecting means for detecting a rear wheel speed, a front wheel-use vehicle speed calculating means for calculating a presumed vehicle speed based on the front wheel speed detected by the front wheel speed detecting means, a rear wheel-use vehicle speed calculating means for calculating a presumed vehicle speed based on the rear wheel speed detected by the rear wheel speed detecting means, a reference vehicle speed determining means for determining reference speeds based on the presumed vehicle speeds calculated respectively in both the vehicle speed calculating means, and a control quantity calculating means for determining operation control quantities for the braking liquid pressure regulating means based on results of determination of wheel slip rates based on the reference vehicle speeds determined in the reference vehicle speed determining means and the wheel speeds detected respectively by the wheel speed detecting means, and, when both of the front and rear wheels are in antilock brake-controlled state, for retarding a pressure increasing timing in one of the front and rear wheel braking liquid pressure regulating means which corresponds to a wheel having a smaller load share, until the wheel speed of the wheel having the smaller load share is started to be reduced while approximating an actual vehicle speed after that wheel speed has been restored to a level near the actual vehicle speed, wherein said control quantity calculating means is arranged to calculate a vehicle deceleration based on at least one of the presumed vehicle speeds calculated in the front and rear wheel-use vehicle speed calculating means, which corresponds to the wheel having the smaller load share, and to control the operation of one of the front and rear wheel braking liquid pressure regulating means, which corresponds to the wheel having the smaller load share, in a braking liquid pressure maintaining mode when the vehicle deceleration is equal to or lower than a preset deceleration and in a braking liquid pressure reducing mode when the vehicle deceleration is higher than the preset deceleration.

2. An antilock brake control system in a vehicle according to claim 1, wherein the preset deceleration set in said control quantity calculating means is set in a range of −0.3 to −0.5 G.

3. An antilock brake control system in a vehicle according to claim 1, wherein said control quantity calculating means is arranged to calculate said vehicle deceleration based on a high select value of the presumed vehicle speeds calculated in said front and rear wheel-use vehicle speed calculating means, respectively.

4. An antilock brake control system in a vehicle according to claim 1, wherein said vehicle is a motorcycle and said control quantity calculating means is arranged to define the front wheel as being said wheel having the smaller load share, when the vehicle deceleration is a large deceleration exceeding −0.32 G, and to define the rear wheel as being said wheel having the smaller load share, when the vehicle deceleration is a small deceleration equal to or lower than −0.32 G.

5. An antilock brake control system in a vehicle according to claim 1, wherein said control quantity calculating means is arranged to define the front wheel as being said wheel having the smaller load share on a road surface having a low friction coefficient, and to define the rear wheel as being said wheel having the smaller load share on a road surface having a high friction coefficient.

* * * * *